United States Patent
Gagnon

(10) Patent No.: US 8,145,047 B2
(45) Date of Patent: Mar. 27, 2012

(54) SELF-REGULATING ELECTRIC HEATING SYSTEM

(75) Inventor: Michel Gagnon, Carignan (CA)

(73) Assignee: Michel Gagnon, Carignan (CA)

( * ) Notice: Subject to any disclaimer, the term of this patent is extended or adjusted under 35 U.S.C. 154(b) by 893 days.

(21) Appl. No.: 12/056,532

(22) Filed: Mar. 27, 2008

(65) Prior Publication Data

US 2009/0245764 A1    Oct. 1, 2009

(51) Int. Cl.
*F24D 19/02* (2006.01)

(52) U.S. Cl. .................................................. 392/436

(58) Field of Classification Search .......... 392/407–440; 165/47–57; 219/210–213
See application file for complete search history.

(56) References Cited

U.S. PATENT DOCUMENTS

| | | | |
|---|---|---|---|
| 2,448,617 A | 9/1948 | Owens | |
| 3,267,255 A | 8/1966 | Schulz | |
| 3,322,931 A | 5/1967 | Laing | |
| 4,187,411 A | 2/1980 | Bryce et al. | |
| 4,541,898 A | 9/1985 | Mase et al. | |
| 4,620,085 A | 10/1986 | Horikawa et al. | |
| 5,189,271 A | 2/1993 | Derbyshire | |
| 5,357,084 A | 10/1994 | McKee et al. | |
| 5,550,350 A * | 8/1996 | Barnes | 219/213 |
| 6,614,992 B2 * | 9/2003 | Schmitt | 392/435 |
| 6,621,983 B2 * | 9/2003 | Thorin | 392/435 |
| 6,700,098 B1 * | 3/2004 | Wyatt et al. | 219/213 |
| 6,855,915 B2 | 2/2005 | Gehring | |
| 2001/0026681 A1 * | 10/2001 | Schmitt | 392/435 |
| 2002/0038799 A1 * | 4/2002 | Laken et al. | 219/476 |
| 2009/0200285 A1 * | 8/2009 | Raidt et al. | 219/213 |

FOREIGN PATENT DOCUMENTS

| | | |
|---|---|---|
| DE | 10100400 | 8/2001 |
| GB | 1396723 | 6/1975 |

* cited by examiner

*Primary Examiner* — Daniel L Robinson

(74) *Attorney, Agent, or Firm* — Norton Rose Canada LLP

(57) ABSTRACT

There is described a heating panel comprising: a heat conductive plate having a first surface that is grooveless and planar and an opposite surface thereof; a self-regulating heating cable residing on the first surface; and an insulating layer covering the self-regulating cable and the first surface to direct the heat towards the opposite surface.

16 Claims, 8 Drawing Sheets

SELF-REGULATING ELECTRIC HEATING SYSTEM

CROSS-REFERENCE TO RELATED APPLICATIONS

This is the first application filed for the present invention.

TECHNICAL FIELD

The present invention relates to the field of residential, commercial, and industrial heating systems.

BACKGROUND OF THE INVENTION

Electric ceiling or floor heating systems usually comprise regular series resistive wires in which an electric current flows. The resistance of the wires converts the electric energy into heat. These electric heating systems are particularly efficient as an additional heating source. However, these systems present a fire hazard. As a result, they cannot be installed directly in contact with wood for example. Not leaning the heating system against the wood implies a waste of heat and renders the heating less efficient. Other models allow direct contact with wood, but are limited in the thickness of the wood itself.

Therefore, there is a need for improving the safety of heating systems of this kind without reducing their efficiency.

SUMMARY OF THE INVENTION

In accordance with a first broad aspect, there is provided a heating panel comprising: a heat conductive plate having a first surface that is grooveless and planar and an opposite surface thereof; a self-regulating heating cable residing on the first surface; and an insulating layer covering the self-regulating cable and the first surface to direct the heat towards the opposite surface.

In accordance with a second broad aspect, there is provided a heating floor comprising: a floor having a walking side and an underside; and at least one heating panel attached to one of the underside and the walking side of the floor and comprising a heat conductive plate having a first surface that is grooveless and planar and an opposite surface thereof; a self-regulating heating cable residing on the first surface; and an insulating layer covering the self-regulating cable and the first surface to direct the heat towards the opposite surface.

In accordance with a third broad aspect, there is provided a heating ceiling comprising: a ceiling having a top side and an opposite bottom side; and at least one heating panel attached to one of the top side and the bottom side of the ceiling and comprising a heat conductive plate having a first surface that is grooveless and planar and an opposite surface thereof; a self-regulating heating cable residing on the first surface; and an insulating layer covering the self-regulating cable and the first surface to direct the heat towards the opposite surface.

In accordance with a fourth broad aspect, there is provided a heating wall comprising: a wall; and at least one heating panel embedded within the wall and comprising a heat conductive plate having a first surface that is grooveless and planar and an opposite surface thereof; a self-regulating heating cable residing on the first surface; and an insulating layer covering the self-regulating cable and the first surface to direct the heat towards the opposite surface.

BRIEF DESCRIPTION OF THE DRAWINGS

Further features and advantages of the present invention will become apparent from the following detailed description, taken in combination with the appended drawings, in which.

DETAILED DESCRIPTION

The heating system presented herein uses self-regulating electric cables as a heat-source. The self-regulating cable comprises two electric conductive wires arranged in parallel and surrounded by a semi-conductive plastic material which has an electric conductivity that varies with temperature. A semi-conductive plastic material is also provided in between the two conductive wires. The conductivity of the plastic material is inversely proportional to temperature, and the plastic material reduces its conductivity to a negligible current at a predetermined threshold temperature. By applying different electrical potentials to both conductive wires, an electrical current flows through the semi-conductive plastic material located between both conductive wires along the entire length of the self-adjusting cable. The flow of current through the plastic material generates heat. The magnitude of the current varies with the conductivity of the plastic material, which varies with temperature. As a result, in low temperature regions of the self-adjusting cable, both the conductivity of and the current flowing through the plastic material are higher, and this generates heat. In the high temperature regions of the self-adjusting cable, both the conductivity of and the current flowing through the plastic material are lower, and less heat is generated. In regions of the self-adjusting cable where the temperature is higher than the threshold temperature, the current flow drops to a minimum between both conductive wires and minimum heat is generated.

In addition to regulating the temperature by itself, a self-regulating cable also reduces the fire hazard in comparison to traditional electric cables and wires since the electric current drops to a minimum when the temperature of the self-regulating cable has reached a threshold.

Figure 1:
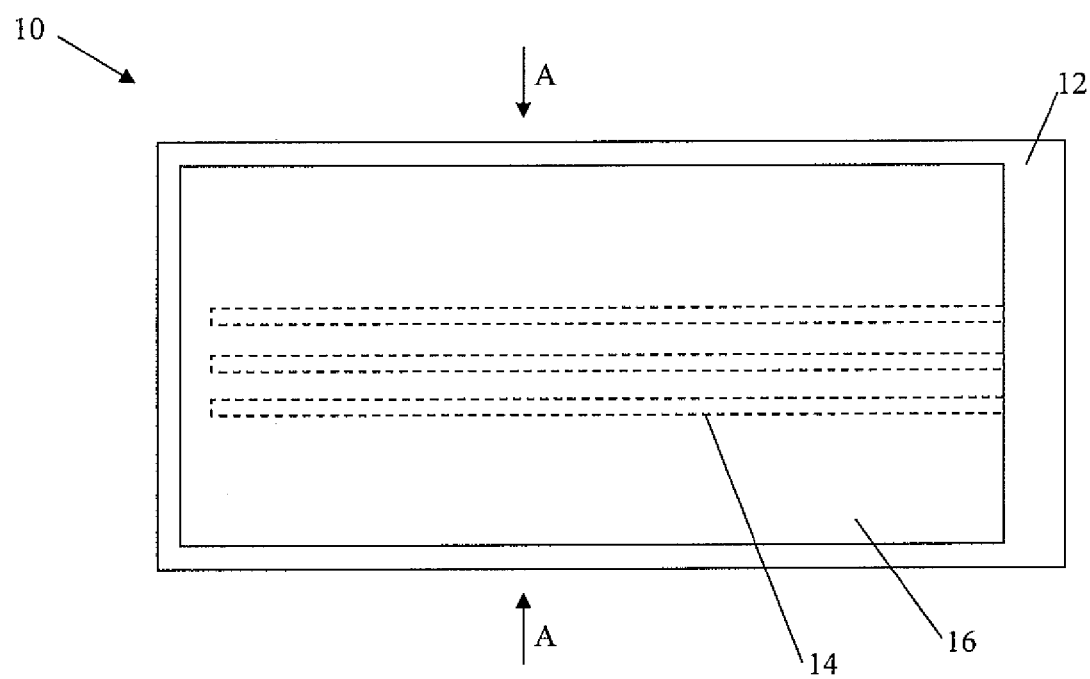
FIG. 1 is a top view of a heating panel in accordance with one embodiment.

FIG. 1 illustrates one embodiment of a heating panel 10. The heating panel 10 comprises a casing 12, a plurality of self-regulating cables 14 and a thermal insulating layer 16. The casing 12 accommodates the self-regulating cables 14 and the insulating layer 16.

Figure 2:
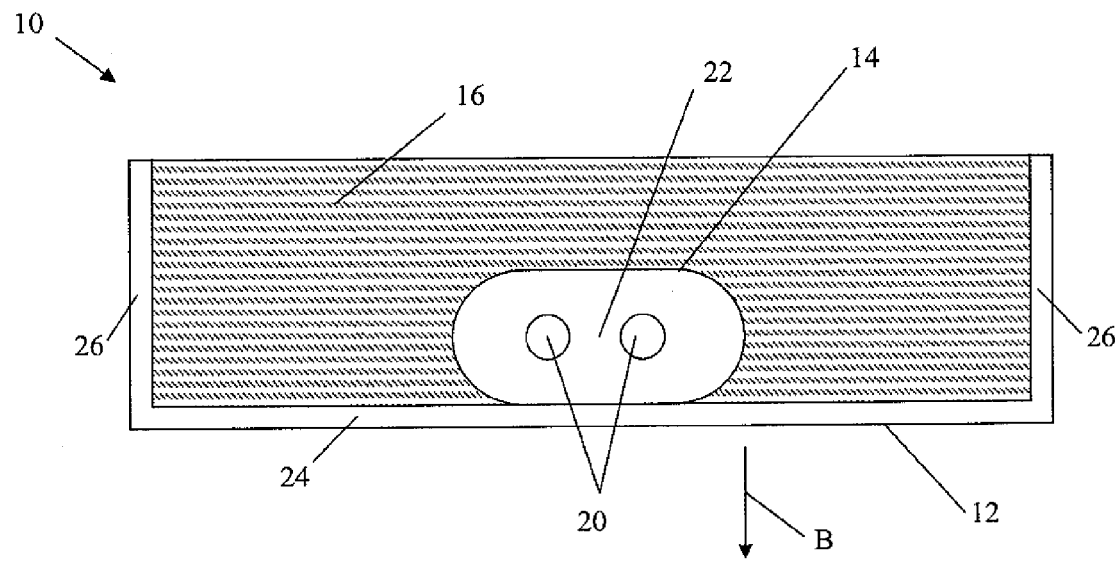
FIG. 2 is a cross-sectional view of a heating panel with a flexible insulating material, in accordance with one embodiment.

As shown in FIG. 2, a self-regulating cable 14 is embedded between the casing 12 and the insulating layer 16. The self-regulating cable 14 comprises two conductive wires 20 and a plastic material 22 of which the conductivity varies with temperature. FIGS. 2 and 3 illustrate the cable as having a pseudo-rectangular shape. It should be understood that round cables may also be used, or self-regulating cables of any other shape known to a person skilled in the art.

The casing 12 comprises a heat conductive plate 24 and two flanges 26. The heat conductive plate 24 is made of a heat conductive material and presents a planar surface. The self-regulating cable 14 resides on the heat conductive plate 24 so that heat generated by the self-regulating cable 14 is transferred to the heat conductive plate 24. As the heat conductive plate 24 is made of a heat conductive material, the generated heat propagates along the heat conductive plate 24. The insulating layer 16 is used to direct the heat in the direction of arrow B.

The planar shape of the heat conductive plate 24 improves the heat transfer between the self-regulating cable 14 and the heat conductive plate 24 and reduces the amount of heat wasted in the case of a non-planar surface. The heating panel 10 may be provided with a cover on top of the casing 12 to enclose the self-regulating cable 14 and the insulating material 16 inside the casing 12.

In one embodiment, the self-regulating cable 14 and the insulating layer 16 are deposited on top of the heat conductive plate 24 and a cover is used to maintain the assembly in position. Alternatively, the self-regulating cable 14 and/or the insulating layer 16 can be secured on the heat conductive plate 24. Any mechanical connector such as an adhesive, an adhesive tape, or a heat transfer tape can be used.

In one embodiment, both the heat conductive plate 24 and the flanges 26 are made of a heat conductive material. It should be understood that any material characterized as having good heat conductivity can be used. Examples of materials are aluminium, satinized steel, galvanized steel, regular steel, etc. Alternatively, only the heat conductive plate 24 of the casing 12 is made of a heat conductive material. The heat conductive plate may be rigid or flexible. The thermal insulating layer 16 can be made of any thermal insulating material having any form. For example, it can be in the form of a rigid material such as polystyrene, a foam such as opened-cell or close-cell foams, or a flexible material such as glass wool, rock wool, acoustic lining, etc.

Figure 3A:
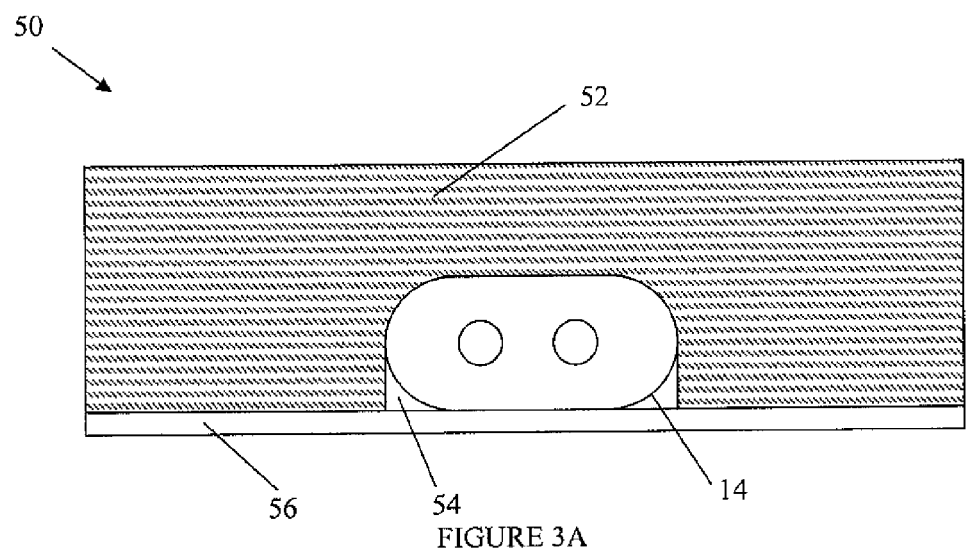
FIGS. 3A and 3B are cross-sectional views of a heating panel with a rigid insulating material, in accordance with two embodiments for the insulating material.
Figure 3B:
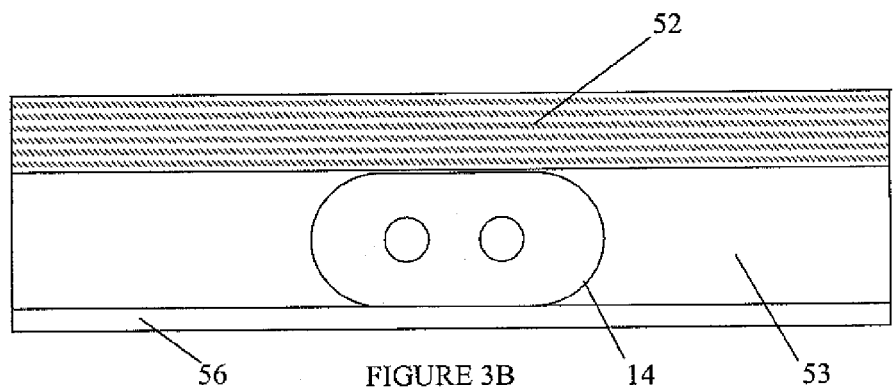

FIGS. 3A and 3B illustrate two embodiments of a heating panel 50 comprising a rigid insulating panel 52. In FIG. 3A, the insulating panel 52 comprises grooves 54 designed to accommodate the self-regulating cable 14 which is embedded between the insulating panel 52 and a heat conductive plate 56. In FIG. 3B, the insulating layer does not have grooves and air is between the insulating panel 52 and the conductive plate 56 where the self-regulating cable 14 is not present. Another insulating material may also be present in this space 53.

Alternatively, a heat conductive material, such as concrete, can be present in the space 53. This conductive material is used to create a heat mass that will redistribute the heat generated by the self-regulating cable 14 across the entire panel. Such a panel can be used in a sidewalk, driveway or other to melt away snow or ice. Using concrete as the additional conductive material makes it solid enough to withstand the weight of vehicles that may be driven over it when covered with concrete, asphalt, stones or other. The concrete (or other conductive material) is poured over the cable and hardens around it, thereby embedding the self-regulating cable 14 within this additional conductive material. The insulating layer 52 is then placed on top of the additional conductive layer. When positioned in the ground for snow melting, the conductive plate 56 faces upwards to direct the heat towards the snow and melt it away. When used in freezers as a frost barrier, underneath a concrete floor, the conductive plate 56 is installed face down on the soil with the insulating material facing up towards the floor.

The insulating panel 52 illustrated in FIGS. 3A and 3B is rigid, which increases the mechanical resistance of the heating panel 50. The conductive plate 56 can be fixed to the insulating panel 52 by an adhesive or other types of fixing means. In one embodiment, the self-regulating cable 14 and the insulating panel 52 are embedded into a casing such as casing 12 illustrated in FIG. 2. A cover may also be provided to maintain the assembly into position. In this case, the insulating panel does not need to be fixed to the casing.

Since each one of the conductive wires 20 of the self-adjusting cable 14 only needs to be connected to a respective electrical potential at one end of the cable, the self-adjusting cable 14 can be cut anywhere along its length. Any shape can be given to the self-adjusting cable.

Figure 4:
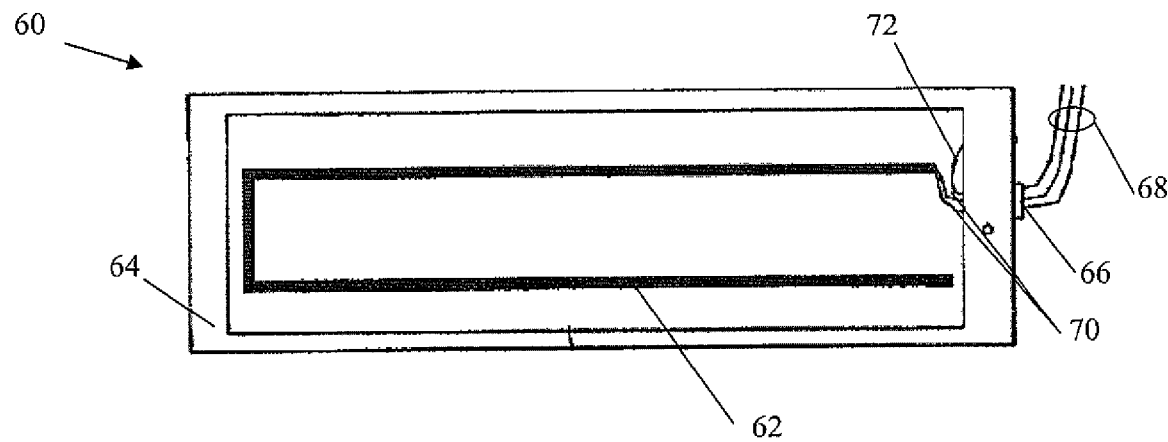
FIG. 4 is a top view of a heating panel with a u-shaped self-regulating cable having wires extending through a side of the panel, in accordance with one embodiment.
Figure 5:
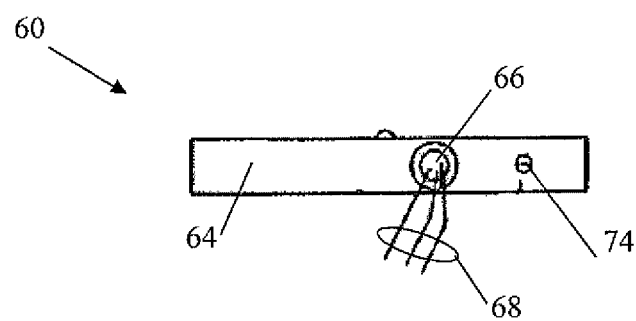
FIG. 5 is a side view of the heating panel of FIG. 4.

FIG. 4 illustrates one embodiment of a heating panel 60 comprising a U-shaped self-regulating cable 62 embedded in a casing 64. It should be understood that the U-shape is one of many configurations possible for the self-regulating cable 62 and should not be considered limiting. Other possible configurations are a straight line, circular shapes, closed perimeters, etc. For simplification purposes, the insulating layer is not shown in FIG. 4. The self-regulating cable 62 has a U-shape that improves the heat distribution along the heat conductive plate of the casing 64. An electrical wire protector 66 is positioned on one side of the casing 64 around an aperture on one end thereof. The feeder wires 68 comprise a ground feeder wire and two electrical wires connected to different potentials. The feeder wires 68 enter the aperture and are connected to the conductive wires 70 of the self-regulating cable 62 and to a ground wire 72. The ground wire 72 is connected to a ground screw 74, as illustrated in FIG. 5, in order to ground the casing 64.

Figure 6:
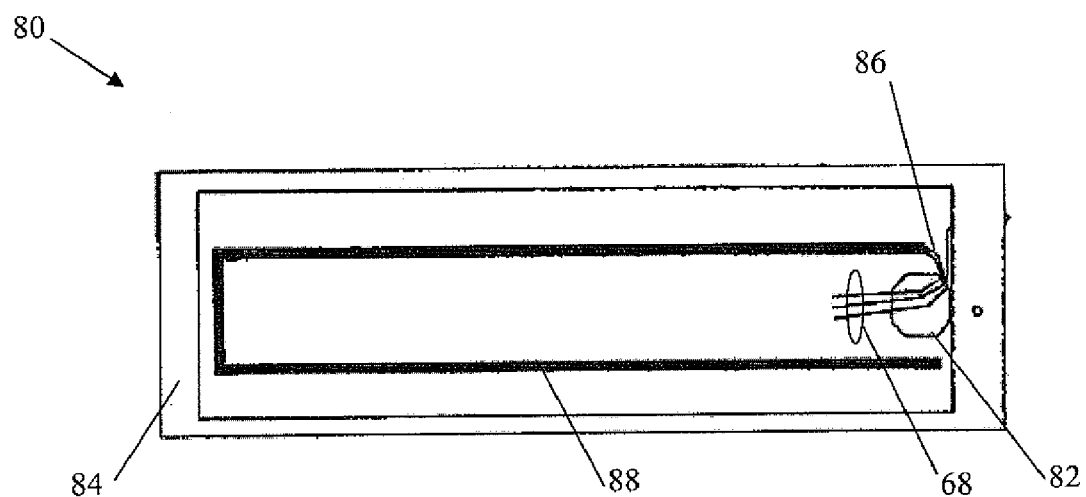
FIG. 6 is a top view of a heating panel with a u-shaped self-regulating cable having wires extending through a top of the panel, in accordance with one embodiment.

FIG. 6 illustrates one embodiment of a heating panel 80 having a junction box 82 located on top of a casing 84. For simplification purposes, the insulation layer is not shown in FIG. 6. The feeder wires 68 enter the junction box 82 and are connected to the conductive wires 86 of a self-regulating cable 88 and to a ground wire, as illustrated in FIG. 7.

Figure 8:
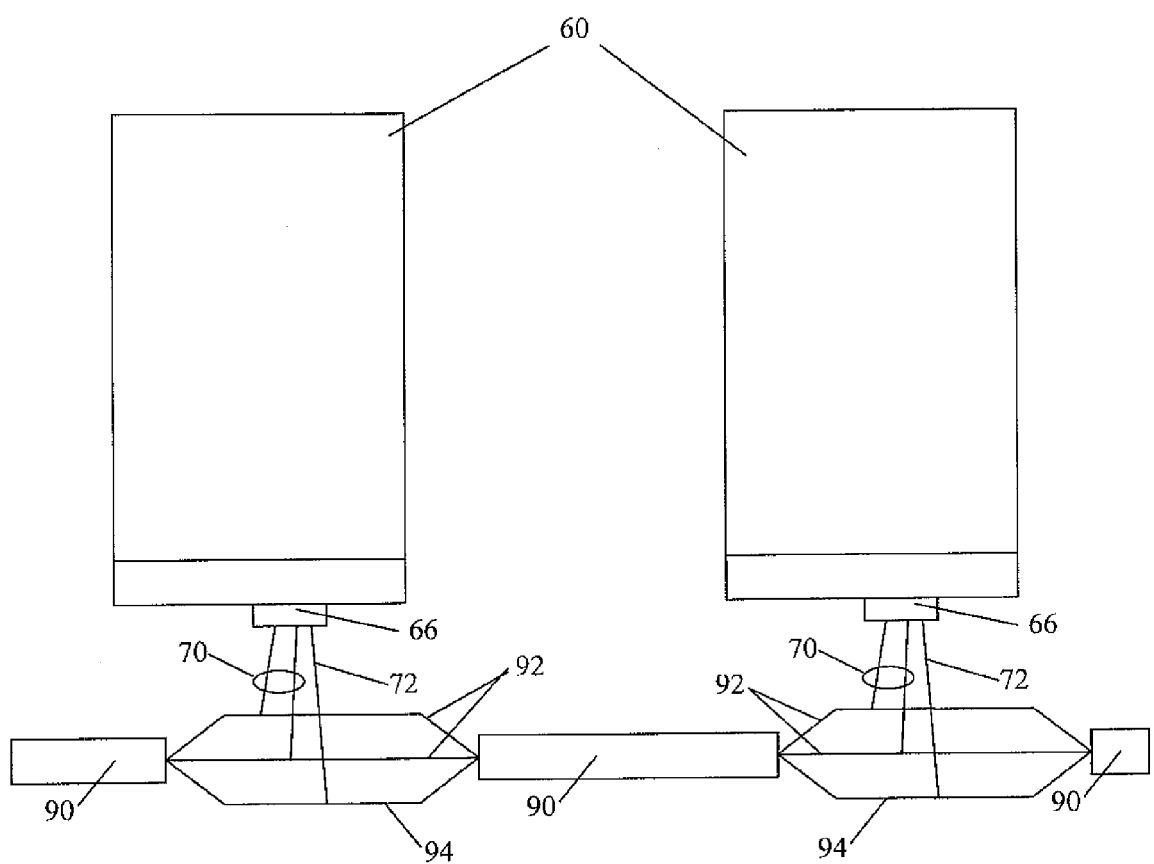
FIG. 8 is a schematic illustrating a parallel connection of two heating panels, in accordance with one embodiment.

Several heating panels can be used to create a heating floor or heating ceiling, for example. FIG. 8 illustrates one embodiment of the parallel electrical connection of two heating panels 60 to a single feeder cable 90. The feeder cable 90 is connected to a power supply (not shown) and comprises two conductive feeder wires 92 having a different electrical potential and a ground feeder wire 94. The feeder cable 90 and the feeder wires 92, 94 are provided in the vicinity of the connectors 66 of the heating panels 60. The conductive wires 70 of the self-adjusting cables are connected to the conductive feeder wires 92 and the ground wire 72 of the heating panels 60 is connected to ground feeder wire 94. A sleeve can be used to protect the electrical connections.

Figure 7:
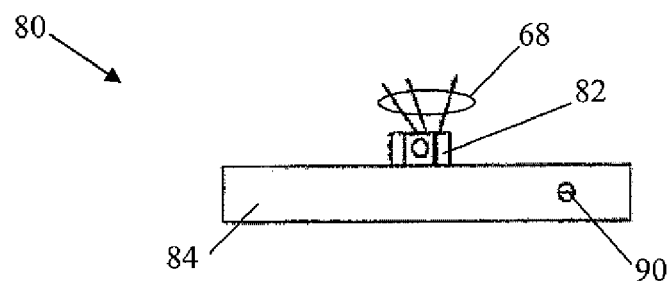
FIG. 7 is a side view of the panel of FIG. 6.

The electrical connection principle illustrated in FIG. 8 can be applied to the heating panels 60 illustrated in FIGS. 6 and 7 and having the connectors 82 located on top of casing 84. The feeder cable 90 is connected to a thermostat used to control the temperature of a room heated by the heating panels. The thermostat turns the power on or off according to a preset temperature.

While the feeder cable 90 and the heating panels 60 and 80 are adapted to ground the heating panels 60 and 80, it should be noted that the heating panels 60 and 80 do not have to be grounded between the panel and junction box since they are spot welded together.

In one embodiment, a first group of heating panels can be connected together in series to a first thermostat and a second group of heating panels can be connected in series to a second thermostat. This configuration allows both groups of heating panels to be separately controlled. Alternatively, each heating panel can be controlled by a corresponding thermostat or all heating panels can be controlled by a single thermostat.

The heating panels can be used as a principal heating system or as an additional heating system. The required number of heating panels depends on their function. Usually, a greater number of heating panels is required to create a principal heating system. The heating capacity of the self-adjusting cables and their length within a heating cable also affect the performance of the heating system.

Figure 9:
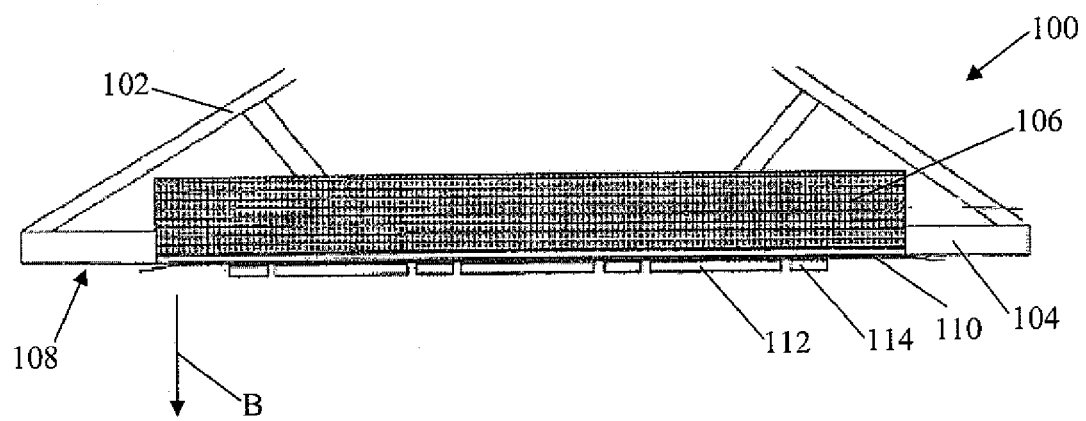
FIG. 9 is a side view of a heating ceiling installed on a top floor/roof ceiling, in accordance with one embodiment.

FIG. 9 illustrates one embodiment of an outside heating ceiling 100 installed in a roof 102. The roof 102 comprises a truss 104 on which a thermal insulation layer 106, such as glass wool, is deposited. The internal face 108 of the truss 104 is covered with a vapour barrier 110. Heating panels 112 are secured below the vapour barrier 110 between two following furrings 114. The heating panels 112 can be any one of heating panels 10, 50, 60 and 80. The heating panels 112 are installed with their heat conductive plate facing down so that the generated heat goes down in the direction of arrow B.

Figure 10:
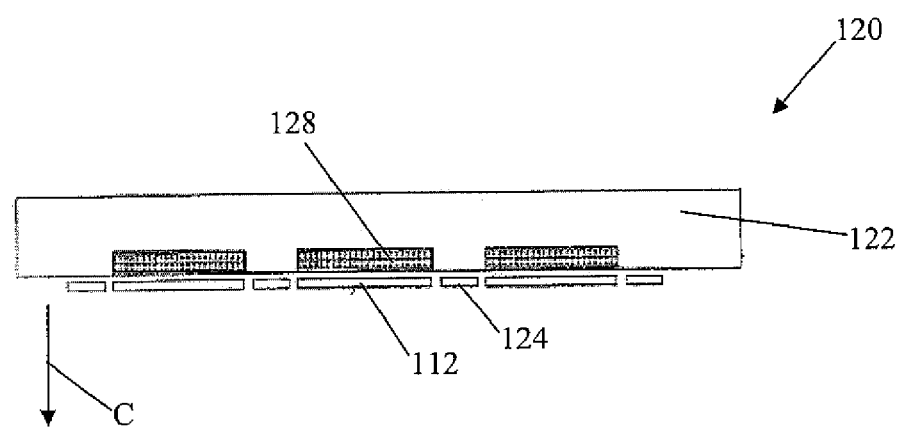
FIG. 10 is a side view of a heating ceiling installed on an inner ceiling, in accordance with one embodiment.

FIG. 10 illustrates one embodiment of a heating system 120 installed in an interior ceiling. The heating panels 112 are secured below a joist 122 of an internal ceiling. The heating panels 112 are located between two following furrings 124. The heating panels 112 are installed with their heat conductive plate facing down so that the generated heat goes down in the direction of arrow C. An insulating layer 128 such as glass wool is also installed on top of the heating panels 112 in order to improve the heating of the room.

In one embodiment, the width of the heating panels 112 is substantially equal to that of furrings 114, 124 in order to facilitate the installation of a board such as a gypsum board below the furrings 114, 124 and the heating panels 112. It also improves the contact and the heat transfer between the gypsum board and the heating panel. While the present application refers to gypsum boards, it should be understood that any other boards such as chipboards can be used.

Figure 11:
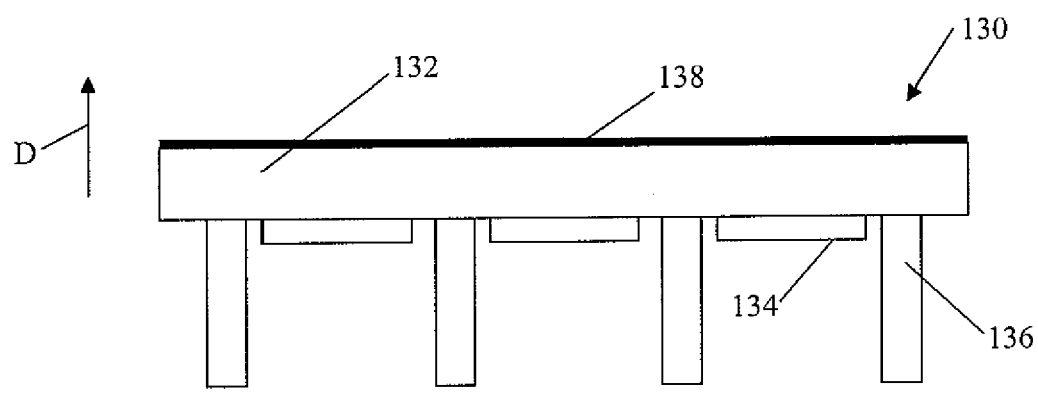
FIG. 11 is a side view of heating panels installed underneath a floor, in accordance with one embodiment.

FIG. 11 illustrates one embodiment of heating system 130 installed below a floor 132. Heating panels 134 are secured below the floor 132 between two following joists 136. The floor 132 may be covered with ceramic tiles 138, for example. The floor can be made of any type of material, including wood and concrete, as is found in large commercial buildings having a garage underneath a first floor of offices.

Figure 12:
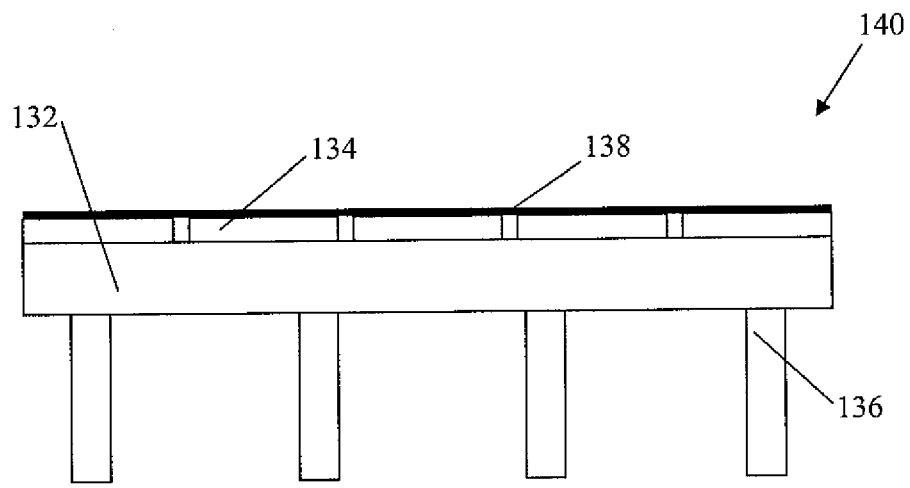
FIG. 12 is a side view of heating panels installed on top of a floor with a floor cover directly on the heating panels, in accordance with one embodiment.

Alternatively, the heating panels 134 may be embedded between the floor 132 and the ceramic tiles 138 as illustrated in FIG. 12. The heating panels 134 can be any ones of heating panels 10, 50, 60 and 80. The heating panels 134 are installed with the insulating layer facing down in order to direct the generated heat in the direction of arrow D. While FIGS. 11 and 12 refer to ceramic tiles 138 as a floor covering, it should be noted that other floor coverings such as a linoleum or a carpet can cover the floor 132. Alternatively, no floor covering can be present on top of the floor 132.

In the case of the heating system 140 illustrated in FIG. 12, the heating panels 134 are preferably of the kind of heating panels 50 illustrated in FIG. 3. The heating panels 134 are installed on top of the floor 132 below the ceramic tiles 138 with their insulating layer facing down. Having a rigid insulating layer increases the mechanical resistance of the heating panel so that a person can walk on the ceramic tiles without any risk of damaging the heating panels. It should be understood that the heating panels may be installed on top of any type of floor, such as wood or concrete floors.

Figure 13:
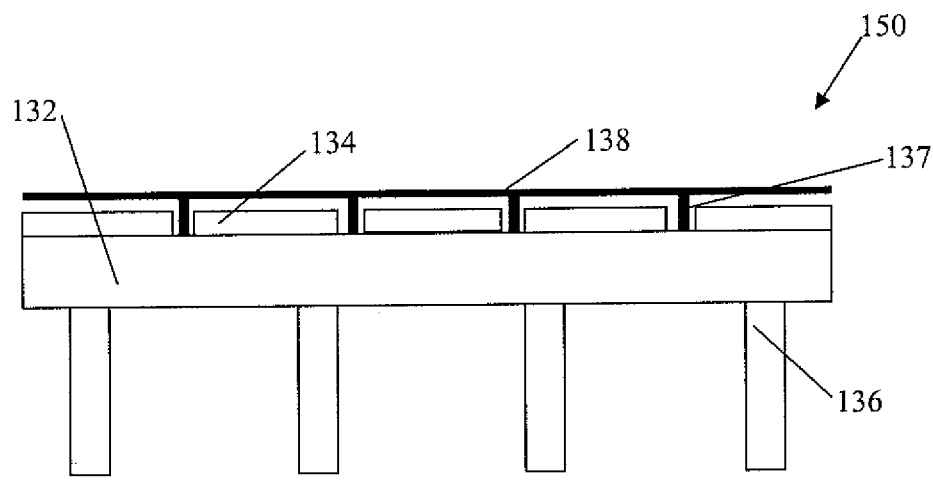
FIG. 13 is a side view of heating panels installed on top of a floor with spacing between the panels and the floor cover, in accordance with one embodiment.

FIG. 13 illustrates an embodiment similar to that shown in FIG. 12, but where a material, such as wood panels or concrete plates are provided between the heating panels 134 and the floor covering 138. A series of posts 137 are used to raise the floor covering 138 and provide the space.

Figure 14:
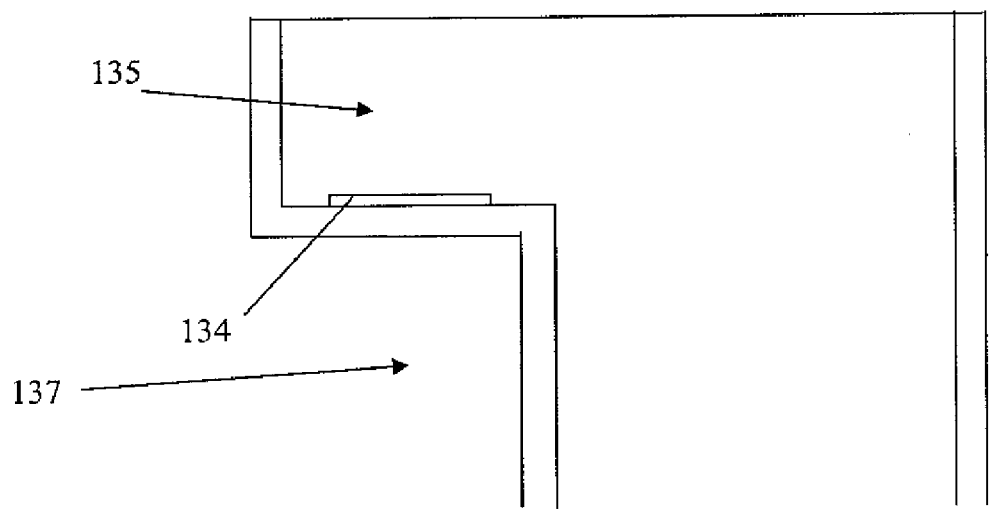
FIG. 14 is a side view of a heating panel installed on a floor that juts out from the rest of the residence.

FIG. 14 illustrates another type of environment in which a heating panel can be used to heat a floor. In this case, the panel 134 is used to heat a floor of a room 135 which extends beyond the walls of whatever space is found below it. Directly beneath the room 135 is the outside air 137, which would result in a colder floor if the heating panel were not used. The heating panel 134 may be placed on top of the floor, as illustrated in FIG. 12, or beneath the floor, as illustrated in FIG. 11.

Figure 15:
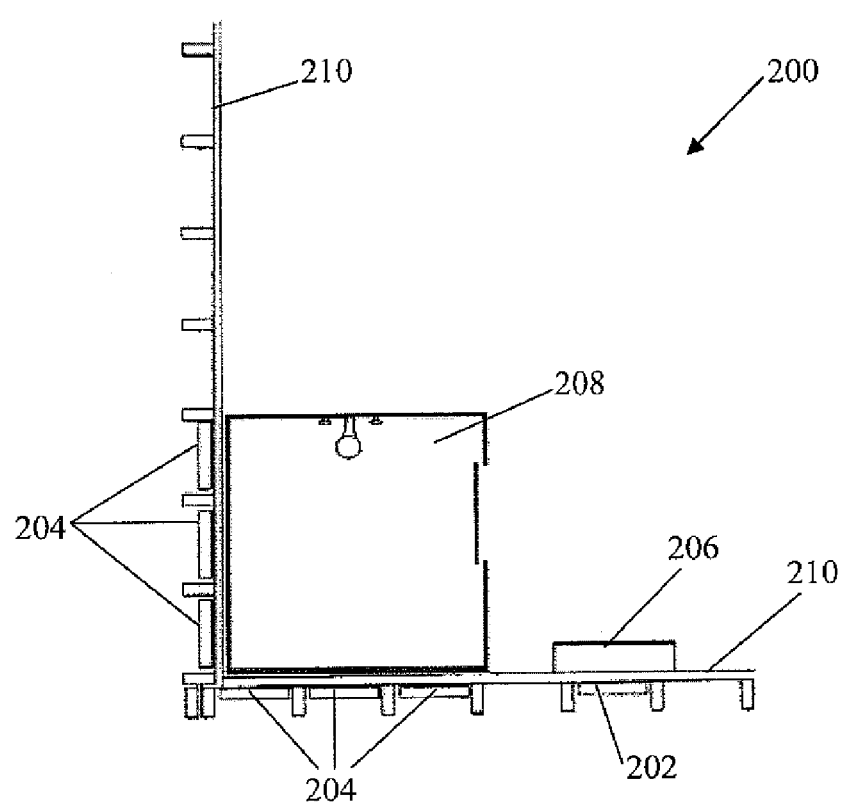
FIG. 15 is a top view of heating panels embedded in side walls, in accordance with one embodiment.

FIG. 15 illustrates one embodiment of a wall heating system 200 which comprises heating panels 202, 204 installed inside walls. The heating panel 202 is used to warm up towels laying on a towel rack 106 and the heating panels 204 are used to heat-up the walls of a shower unit 208. The heating panels 202 and 204 are installed inside walls behind a gypsum board 210. The heat conductive plate of the heating panels 202, 204 is facing the gypsum board 210 in order to direct the generated heat towards the towel rack 206 and the shower unit 208, respectively.

Heating panels can be installed in other locations such as in the frame of a window for example. A single heating panel may be installed either in a ceiling or in a floor at a specific location, such as where a chair happens to be, for example.

Having the electric heating cables be self-regulating allows an easy installation. The self-regulating cable may be in contact with wood without risking a fire hazard. Conventional electric cables would fail to satisfy the fire-safety regulations if installed directly underneath the floor.

The heating panels can be secured to the floor, the ceiling or the wall with screws, adhesive, and/or special clips supplied therefor. Any mechanical connector can be used. The heating panels can be of any shape and size. They can be rectangular, square or circular. They can also be designed to fit one into the other to form a continuous floor or ceiling for example. In addition, a same self-regulating cable may be used by a plurality of panels, or each panel may have its own self-regulating cable.

It should be noted that the embodiments of the invention described above are intended to be exemplary only. The scope of the invention is therefore intended to be limited solely by the scope of the appended claims.

I claim:

1. A heating panel comprising:
   a casing comprising a heat conductive plate having a first surface that is grooveless and planar and an opposite surface thereof, the casing having an aperture thereon;

a self-regulating heating cable fully contained in the heating panel, residing on said first surface and having a connecting end and a terminating end;

an insulating layer covering said self-regulating cable and said first surface to direct heat emanating from said self-regulating cable towards said heat conductive plate; and at least two electrical wires extending through the aperture and connected to the connecting end of the self-regulating heating cable, for connection of the heating panel to a power source.

2. A heating panel as claimed in claim 1, wherein said self-regulating heating cable is positioned to maximize a surface area of said grooveless planar surface that is in contact with said self-regulating heating cable.

3. A heating panel as claimed in claim 1, wherein said heat conductive plate has a flange extending along a perimeter of said heat conductive plate in a direction of said insulating layer, said heat conductive plate and said flange forming said casing.

4. A heating panel as claimed in claim 3, further comprising a cover adapted to enclose said insulating layer and said self-regulating cable in said casing.

5. A heating panel as claimed in claim 1, wherein said insulating layer is made of a flexible material.

6. A heating panel as claimed in claim 5, wherein said flexible material is a foam.

7. A heating panel as claimed in claim 5, wherein said flexible material is glass wool.

8. A heating panel as claimed in claim 1, wherein said insulating layer is an insulating panel made of a rigid material and comprising grooves to accommodate said self-regulating cable.

9. A heating panel as claimed in claim 8, wherein said insulating panel is made of polystyrene.

10. A heating panel as claimed in claim 1, wherein said heat conductive plate is made of a metal.

11. A heating floor comprising:

a floor having a walking side and an underside; and at least one heating panel attached to one of said underside and said walking side of said floor and comprising a casing comprising a heat conductive plate having a first surface that is grooveless and planar and an opposite surface thereof, the casing having an aperture thereon;

a self-regulating heating cable fully contained in heating panel, residing on said first surface and having a connecting end and a terminating end;

an insulating layer covering said self-regulating cable and said first surface to direct heat emanating from said self-regulating cable towards said heat conductive plate; and at least two electrical wires extending through the aperture and connected to the connection end of the self-regulating heating cable, for connection of the heating panel to a power source.

12. A heating floor as claimed in claim 11, wherein said self-regulating heating cable is positioned to maximize a surface area of said grooveless planar surface that is in contact with said self-regulating heating cable.

13. A heating floor as claimed in claim 11, wherein said at least one heating panel is secured below said floor to said underside and said opposite surface of said heat conductive plate is facing said floor.

14. A heating floor as claimed in claim 13, wherein said at least one heating panel is secured on top of said floor to said walking side and said insulating layer is in contact with said floor.

15. A heating floor as claimed in claim 14, further comprising a floor covering above said heating panel.

16. A heating floor as claimed in claim 11, wherein said floor is made of wood.

* * * * *